(12) United States Patent
Dotan et al.

(10) Patent No.: US 8,694,993 B1
(45) Date of Patent: Apr. 8, 2014

(54) VIRTUALIZATION PLATFORM FOR SECURED COMMUNICATIONS BETWEEN A USER DEVICE AND AN APPLICATION SERVER

(75) Inventors: Yedidya Dotan, Tel Aviv (IL); Boris Kronrod, Netanya (IL); Orit Yaron, Herzelia (IL); Lawrence N. Friedman, Arlington, MA (US); Assaf Shoval, Rishon Le-Zion (IL)

(73) Assignee: EMC Corporation, Hopkinton, MA (US)

( * ) Notice: Subject to any disclaimer, the term of this patent is extended or adjusted under 35 U.S.C. 154(b) by 309 days.

(21) Appl. No.: 13/077,230

(22) Filed: Mar. 31, 2011

(51) Int. Cl.
*G06F 9/455* (2006.01)
*G06F 15/16* (2006.01)

(52) U.S. Cl.
USPC .............................................. 718/1; 709/203

(58) Field of Classification Search
None
See application file for complete search history.

(56) References Cited

U.S. PATENT DOCUMENTS

| | | | | |
|---|---|---|---|---|
| 6,529,953 | B1* | 3/2003 | Van Renesse | 709/223 |
| 6,791,980 | B1* | 9/2004 | Li | 370/390 |
| 8,321,648 | B2* | 11/2012 | Condict | 711/170 |
| 2005/0149481 | A1* | 7/2005 | Hesselink et al. | 707/1 |
| 2007/0186212 | A1* | 8/2007 | Mazzaferri et al. | 718/1 |

OTHER PUBLICATIONS

U.S. Appl. No. 12/854,641, filed Aug. 11, 2010 and entitled, Disposable Browser for Commercial Banking, pp. 1-19.
G. Decandia et al., "Dynamo: Amazon's Highly Available Key-value Store," SOSP 2007, pp. 205-218.
L. Lamport et al., "The Byzantine Generals Problem," ACM Transactions on Programming Languages and Systems, vol. 4, No. 3, 1982, pp. 382-401.
Hash tree, http://en.wikipedia.org/wiki/Hash_tree, Mar. 31, 2011, pp. 1-3.

* cited by examiner

*Primary Examiner* — Kenneth Tang
(74) *Attorney, Agent, or Firm* — Ryan, Mason & Lewis, LLP (57) ABSTRACT

A modular virtualization platform is provided for secured communications between a user device and an application server. A client-side computing device performs secured communications during a virtual session with an application server across a network. The client-side computing device loads a virtual machine client; and selects a remote module to serve as a virtualization server for the virtual session based on one or more performance factors. The virtual session is established with the selected module, and secured communications can occur between the client-side computing device and the application server via the virtual session of the selected module. The performance factors can be collected from a plurality of modules using a peer-to-peer gossip-based state notification process. A route list preferably stores the performance factors for a plurality of modules. The route list can contain pointers to a plurality of remote modules in a plurality of virtualization platforms, to increase reliability.

24 Claims, 9 Drawing Sheets

- WHAT SERVERS I KNOW — 1010
- THROW AWAY THOSE I KNOW ARE DOWN NOW — 1020
- RANK EXISTING SERVERS — 1030
- SELECT TOP SERVERS — 1040

| MODULE URL (1120) | GEOGRAPHIC DESCRIPTOR (1130) | PERFORMANCE HASHCODE (1140) | |
|---|---|---|---|
| http://xyz.com/1 | USE | 1:2:55:3333... | 1110-1 |
| http://xyz.com/2 | USE | 2:333:444:222 | 1110-2 |
| http://xyz.com/3 | USW | 2:555:333:111 | 1110-3 |

VIRTUALIZATION PLATFORM FOR SECURED COMMUNICATIONS BETWEEN A USER DEVICE AND AN APPLICATION SERVER

FIELD OF THE INVENTION

The present invention relates generally to techniques for securing communications over a network and other types of communication systems.

BACKGROUND OF THE INVENTION

Malicious software (malware) is designed to harm or access a computer system without the informed consent of the owner. Malware is a serious threat to many computer systems, particularly in an online environment. Malware includes computer viruses, Trojan horses, worms and other malicious and unwanted software programs. Trojan horses, for example, install themselves on user machines without being perceived by the user. Trojan horses may then enable a controller to record data from an infected machine (e.g., key loggers), listen in on conversations (e.g., Man in The Middle or MiTM), or even hijack an HTTP session from within a browser (e.g., Man in The Browser or MiTB). Trojan horses are able to record keyboard entries at given web sites, and thereby steal the users' user names and passwords. Trojan horses are also able to change transactions as they occur. Thus, the user may think he or she is performing a legitimate transaction (e.g., paying a bill) but in reality the user is sending money to another account. Trojan horses also allow session hijacking, whereby a remote fraudster performs transactions via the user's infected machine.

A number of security techniques have been proposed or suggested for reducing the susceptibility of a user to such malware. For example, strong authentication methods, such as multi-factor authentication (such as "something you have" and "something you know") or a challenge response protocol can be used to improve the security of communications between the user and an application server over a network.

In addition, U.S. patent application Ser. No. 12/854,641, filed Aug. 11, 2010 and entitled "Disposable Browser for Commercial Banking," incorporated by reference herein and hereinafter referred to as the "'641 U.S. patent application," discloses a virtual environment for secure communications between a client-side computing device and a remote application server through a virtual computing environment provided by an intermediate virtualization server. The virtual computing environment includes a disposable component, allowing all settings to be initialized to a secure state after each user session.

In an e-commerce environment, reliability and resilience are also important requirements. Reliability is often measured as a percentage of time that a system is available. Resilience is the ability to provide and maintain an acceptable level of service even in the presence of faults and other challenges to normal operation. In addition, it is important that such systems maintain reliability and resilience, even as they grow. Scalability is the ability of a system to accommodate growth.

A need exists for improved techniques for reducing the susceptibility of a user to malware while maintaining acceptable measures of reliability, resilience and scalability.

SUMMARY OF THE INVENTION

The present invention in the illustrative embodiments described herein provides a modular virtualization platform for secured communications between a user device and an application server. In accordance with an aspect of the invention, a client-side computing device performs secured communications during a virtual session with an application server across a network. The client-side computing device loads a virtual machine client; and selects a remote module to serve as a virtualization server for the virtual session based on one or more performance factors. The virtual session is established with the selected module, and secured communications can occur between the client-side computing device and the application server via the virtual session of the selected module.

In accordance with another aspect of the invention, the performance factors are collected from a plurality of modules using a peer-to-peer gossip-based state notification process. A route list preferably stores the performance factors for a plurality of modules. The route list can be generated from a bootstrap point. The route list can contain pointers to a plurality of remote modules in a plurality of virtualization platforms, to increase reliability. The route list is optionally based on a hash tree format that indicates a distance to a given module.

The authentication techniques of the illustrative embodiments overcome one or more of the problems associated with the conventional techniques described previously, and permit users to work from a secure virtual environment, taking the form of a disposable browser environment, without direct interaction between malware and the remote application server, such as an online banking site. These and other features and advantages of the present invention will become more readily apparent from the accompanying drawings and the following detailed description.

DETAILED DESCRIPTION

Figure 1:
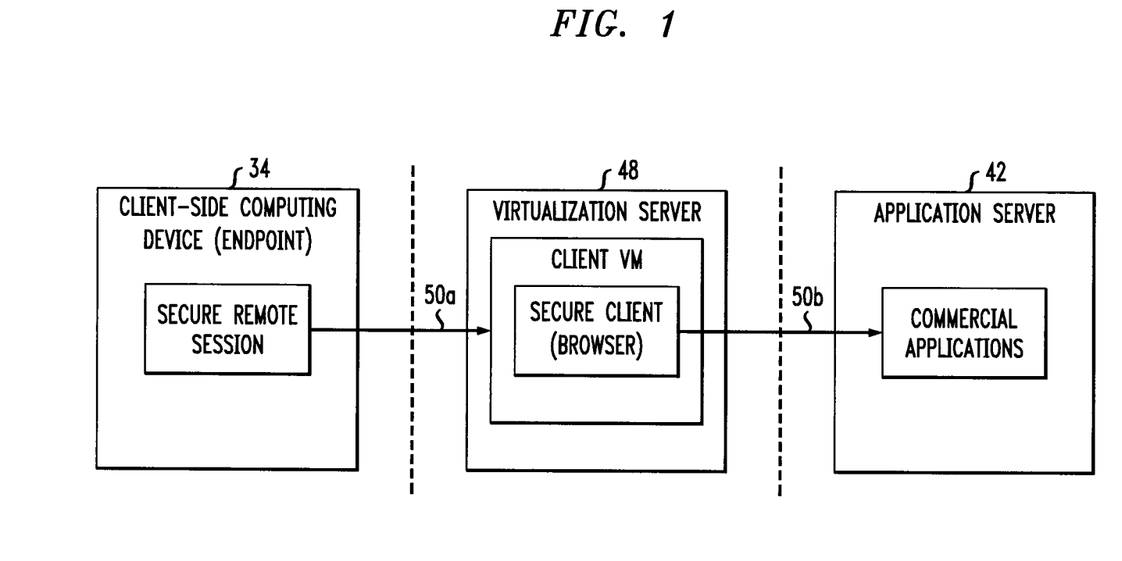
FIG. 1 illustrates an exemplary client-side computing device (CSCD) establishing a virtual session running on a virtualization server to allow for secured communications in accordance with the present invention.

The present invention provides a virtualization platform for secured communications between a user device (referred to herein as a client-side computing device) and a remote application server. The invention will be described herein with reference to an exemplary communication system in which a client-side computing device communicates with an application server by means of a virtualization server. FIG. 1 illustrates an exemplary client-side computing device (CSCD) 34 establishing a virtual session running on a virtualization server 48 to allow for secured communications 50*a*, 50*b* (collectively, referred to as secured communications 50) between the CSCD 34 and an application server 42 via the virtualization server 48.

According to one aspect of the present invention, the virtualization server 48 may be implemented using a virtualization platform 500, discussed further below in conjunction with FIG. 5, that provides secured communications 50 between the CSCD 34 and an application server 42. Among other benefits, the disclosed virtualization platform 500 demonstrates improved reliability, resilience and scalability. According to one aspect of the invention, discussed further below in conjunction with FIGS. 5 and 6, the virtualization platform 500 employs a plurality of modules 600 that can be repaired or replaced in the event of a failure. In addition, additional modules 600 can be added to a given virtualization platform 500, as well as adding entire virtualization platforms 500, to accommodate growth. The virtualization server 48 of FIGS. 1 and 2, for a given virtual session, can be executed on a given module in the virtualization platform 500.

According to another aspect of the invention, discussed further below in conjunction with FIGS. 9-11, each module is aware of the state of other modules in a given virtualization platform 500 and in other virtualization platforms 500 through a decentralized gossip-based state notification process. Generally, the various modules in a given virtualization platform 500 and in other virtualization platforms 500 communicate in a peer-to-peer manner similar to a mesh network. For example, a given module can report problems and/or one or more performance indicators to one or more other modules, which in turn, can repeat the information to other modules in the system.

According to yet another aspect of the invention, discussed further below in conjunction with FIGS. 7 and 8, each CSCD 34 includes a route list 1100 and an endpoint session creation process 800 for selecting an appropriate module 600 to serve as the virtualization server 48 of FIGS. 1 and 2, for a given virtual session, and to establish a session with the selected module 600.

The CSCD 34 may represent a portable device, such as a mobile telephone, personal digital assistant (PDA), wireless email device, game console, etc. The CSCD 34 may alternatively represent a desktop or laptop personal computer (PC), a microcomputer, a workstation, a mainframe computer, a wired telephone, a television set top box, or any other information processing device which can benefit from the use of single sign-on techniques in accordance with the invention.

The CSCD 34 may also be referred to herein as simply a "user." The term "user" should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other authentication information described as being associated with a user may, for example, be associated with a CSCD device 34, a person utilizing or otherwise associated with the device, or a combination of both the person and the device.

The application server 42 may be, for example, a remote application server such as a web site or other software program that is accessed by the CSCD 34 over a network 30. The network 30, may comprise, for example, a global computer network such as the Internet, a wide area network (WAN), a local area network (LAN), a satellite network, a telephone or cable network, or various portions or combinations of these and other types of networks.

As previously indicated, the virtualization server 48 may be implemented using a virtualization platform 500, discussed further below in conjunction with FIG. 5, that provides secured communications 50 between the CSCD 34 and an application server 42 with improved reliability, resilience and scalability.

Figure 2:
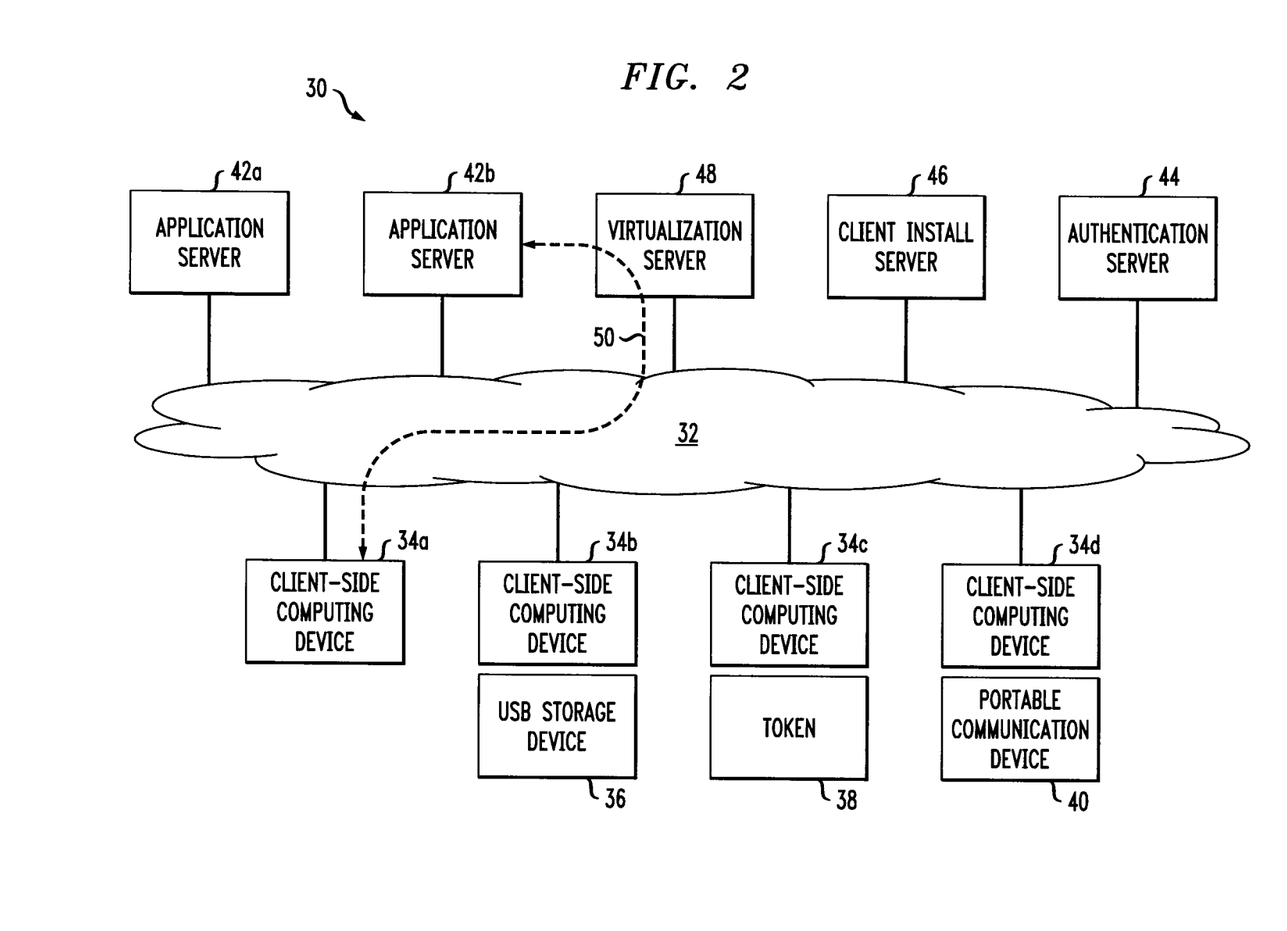
FIG. 2 illustrates a network environment in which various embodiments of the present invention can be implemented.

FIG. 2 illustrates a network environment 30 in which various embodiments of the present invention can be implemented. Network environment 30 includes a network 32 (such as, for example, the Internet). Network environment 30 also includes a set of client-side computing devices (CSCDs) 34, depicted as CSCDs 34(*a*)-34(*d*), that are connected to the network 32. Some CSCDs 34, such as CSCD 34(*b*), attach to a small external portable storage device such as a Universal Serial Bus (USB) "thumb drive" or storage device 36. A user of a CSCD 34, such as CSCD 34(*c*), may hold a token device 38. A user of a CSCD 34, such as CSCD 34(*d*), may hold a portable communication device 40, such as a cellular phone.

Network 32 also connects to one or more application servers 42, depicted as application servers 42(*a*)-42(*b*), an authentication server 44, a client install server 46, and a virtualization server 48. It should be understood that although one each is shown of the authentication server 44, client install server 46, and virtualization server 48, in some embodiments there may be multiple instances of each, while in other embodiments, some of these elements may be omitted. Furthermore, some of these elements may be replaced with various combinations of other devices that perform similar tasks.

As discussed above in conjunction with FIG. 1, in one exemplary mode of operation, the CSCD 34(*a*) may establish a virtual session running on virtualization server 48 to allow for secured communications 50 between CSCD 34(*a*) and an application server 42(*b*) via the virtualization server 48.

Figure 3:
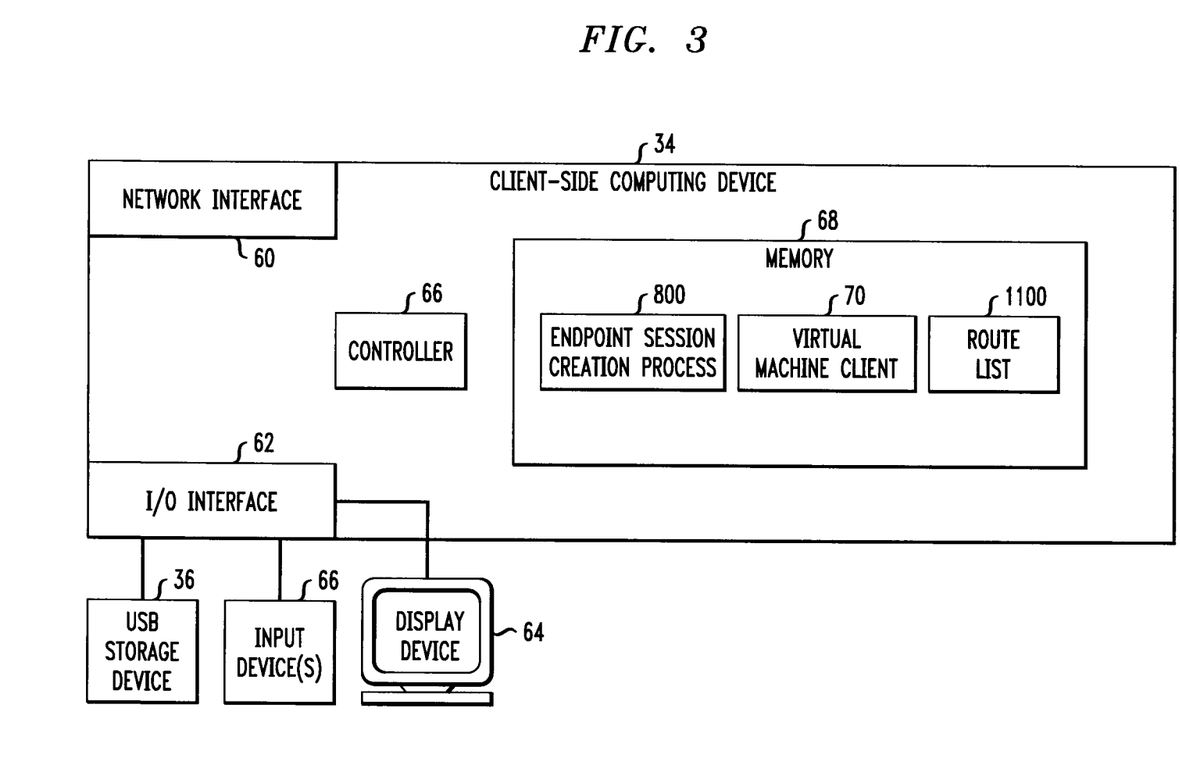
FIG. 3 depicts an exemplary implementation of a CSCD of FIG. 2 in further detail.

FIG. 3 depicts an exemplary implementation of a CSCD 34 of FIG. 2 in further detail. A CSCD 34 is typically a user terminal having a unique and tamper-proof DeviceID. CSCD 34 includes a network interface 60 for connecting to network 32; an input/output interface 62 for connecting to a USB device 36, a display device 64, and/or one or more input devices 66 (such as, for example, a keyboard, keypad, mouse, trackpad, trackball, touch-sensitive device, or any similar devices); a controller 66 (such as, for example, a processor, microprocessor, central processing unit, or dedicated circuitry); and memory 68. Memory 68 may include any type of volatile or non-volatile storage, such as, random access memory, read-only memory, flash memory, magnetic storage, optical storage, or any combination thereof. Memory 68 stores a virtual machine (VM) client 70, which may be executed by controller 66. Memory 68 also stores data used by VM client 70. Memory 68 may also store other well-known elements, such as, for example, an operating system, system settings, and user data.

As shown in FIG. 3, the memory 68 also comprises an endpoint session creation process 800 and a route list 1100. Generally, as discussed further below in conjunction with FIG. 11, the route list 1100 is a routing employed by the CSCD 34 to identify an appropriate virtualization server 48 for a given communication with a desired application server 42. As discussed hereinafter, the route list 1100 is preferably generated or updated by the CSCD 34 each time the CSCD 34 accesses a new virtualization server 48. In one exemplary embodiment, to ensure high availability, the route list 1100 contains pointers to a plurality of modules on a plurality of different virtualization platforms 500. The exemplary route list 1100 is based on a hash tree format that indicates a distance to a given module 600. As discussed further below in conjunction with FIGS. 8 through 10, the route list 1100 is generated based on gossip data provided between the modules assessing the performance of other modules 600. In addition, as discussed further below in conjunction with FIG. 8, the route list 1100 can be regenerated from a bootstrap point.

Generally, as discussed further below in conjunction with FIG. 8, the endpoint session creation process 800 evaluates the collected gossip data and selects an appropriate module 600 to serve as a virtualization server 48 for a given virtual session with a desired application server 42.

Figure 4:
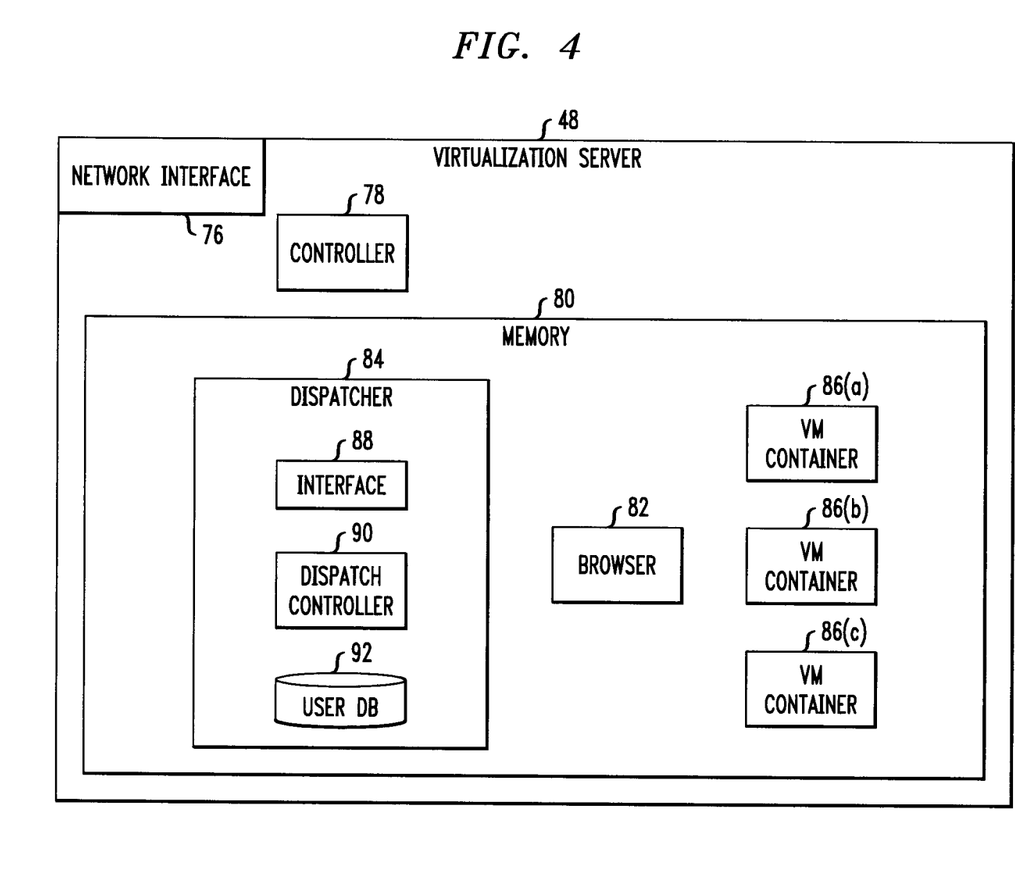
FIG. 4 depicts an exemplary implementation of a virtualization server of FIG. 2 in further detail.

FIG. 4 depicts an exemplary implementation of a virtualization server 48 of FIG. 2 in further detail. Virtualization server 48 includes a network interface 76 for connecting to network 32, a controller 78 (such as, for example, a processor, microprocessor, central processing unit, or dedicated circuitry), and memory 80. Memory 80 may include any type of volatile or non-volatile storage, such as, random access memory, read-only memory, flash memory, magnetic storage, optical storage, or any combination thereof. Memory 80 stores a secure browser program 82, a VM dispatcher 84, and a set of VM containers 86 (depicted as VM containers 86(*a*)-86(*c*)). Each VM container 86 contains data for a virtual machine session with a CSCD 34 and may include an instance of browser 82. Memory 80 also stores other well-known elements, such as, for example, an operating system, system settings, and user data. Dispatcher 84 includes several elements, including an interface 88, a dispatch controller 90, and a user database 92.

In operation, a user wishing to process an online transaction, such as a commercial banking transaction, or otherwise engage in secured communication 50 with an application server 42 (such as a web banking server) uses a CSCD 34 to establish a secure VM session (using VM client 70) on virtualization server 48. The user is then able to run an instance of browser 82 on the virtualization server 48 (in a VM context) in order to access application server 42. Because browser 82 is secure and run on a secure environment, the user may rest assured than there is no malware running within the VM session on the virtualization server 48, thereby increasing the security of the communications 50. Further security can be ensured once data has left the virtualization server 48 for the CSCD 34, as will be described in further detail below.

In order to ensure that no malware is running within the VM client 70, various methods may be used. In some embodiments, the user is provided with a copy of the VM client 70 software on a portable USB storage device 36, which the user may then attach to his CSCD 34. In one embodiment, the USB storage device 36 may be read-only, thereby preventing the VM client software from being modified by malware. The user is then able to securely run the VM client 70 directly from the USB storage device 36. In other embodiments, the user downloads the VM client 70 across network 32. Upon proper authentication, the user is able to obtain and install the VM client 70. For example, the authentication can determine whether the user, typically identified by a userID, is authorized to access the application server 42 (such as, by determining if the user has an established account at the bank). The authentication server 44 can also communicates with the user using a strong authentication method to ensure that the user is not masquerading by altering his identity. See, for example, FIG. 4 of the '641 U.S. patent application, for an exemplary method for authenticating the user and providing the VM client 70.

Once the user has successfully installed the VM client 70 on CSCD 34, the user is able to use the VM client 70 to establish a VM session with virtualization server 48, according to an appropriate login method. See, for example, FIG. 5 of the '641 U.S. patent application, for an exemplary method for establishing a VM session with virtualization server 48.

Once the user has properly logged in to the application server 42 using the VM client 70, the user is able to securely communicate with application server 42 via the virtualization server 48. See, for example, FIG. 6 of the '641 U.S. patent application, for an exemplary method for secure communications between the CSCD 34 and the application server 42 via the virtualization server 48.

In some embodiments, browser 82 renders all web pages provided by application server 42 and sends the fully rendered images back to the VM client 70 running on CSCD 34. The fully rendered image may be a bitmap that represents what the web page is supposed to look like. The bitmap may be displayed to the user on screen 64 without further processing. This prevents any malware running on the CSCD 34 from modifying the web pages sent by the application server 42, since it is difficult for malware to convincingly modify a rendered page image. It also helps secure the data transmitted within the web page against eavesdropping, because it is difficult for malware to interpret data contained within a rendered page image, while it is quite easy for a human user to do so.

After the user is done with an online banking session, or any other session with application server 42, all data collected by the virtualization server 48 during the session can be destroyed. Therefore, no malware can be installed on the virtualization server 48 in normal operation and no user passwords are stored on virtualization server 48. This disposable characteristic of the virtual environment ensures the security of the virtual environment, and reduces the risk of malicious intrusion into the communications between a user and the application server 42. Thus, upon the user attempting to log back into the application server 42, a new VM session is established having the original pre-configured settings stored in the user database 92.

Figure 5:
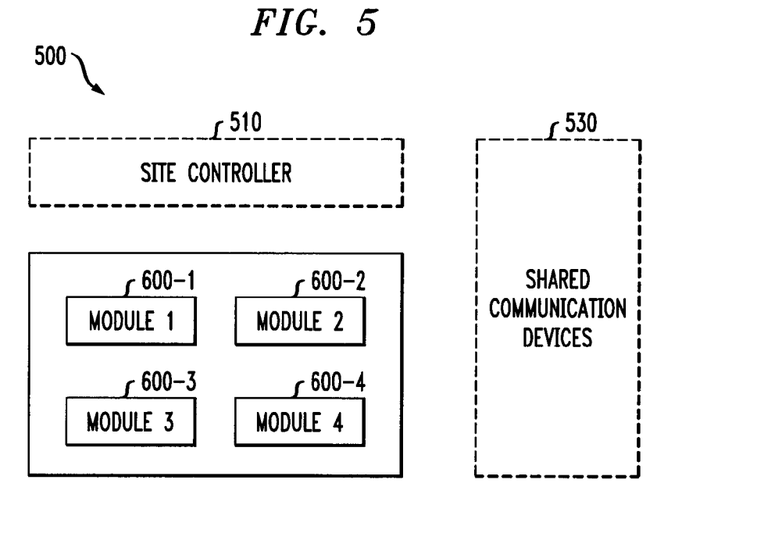
FIG. 5 is a schematic block diagram of an exemplary virtualization platform incorporating features of the present invention.

FIG. 5 is a schematic block diagram of an exemplary virtualization platform 500 incorporating features of the present invention. As shown in FIG. 5, the exemplary virtualization platform 500 comprises a site controller 510, a plurality of modules 600-1 through 600-4 (collectively, modules 600) and a set of shared communication devices 530. The plurality of modules 600 helps to ensure high availability. An exemplary module 600 is discussed further below in conjunction with FIG. 6. Generally, each module 600 can serve as an instance of a virtualization server 48 of FIGS. 1 and 2. The set of shared communication devices 530 comprise, for example, firewalls and a load balancer. The site controller 510 of a given virtualization platform 500 collects gossip data from other virtualization platforms 500 and controls communications with other virtualization platforms 500. In addition, the site controller 510 routes sessions between modules 600 within the same virtualization platform 500, implicitly via the gossip data. In addition, the virtualization platform 500 controls the modules 600 (such as powering down and configuration).

Figure 6:
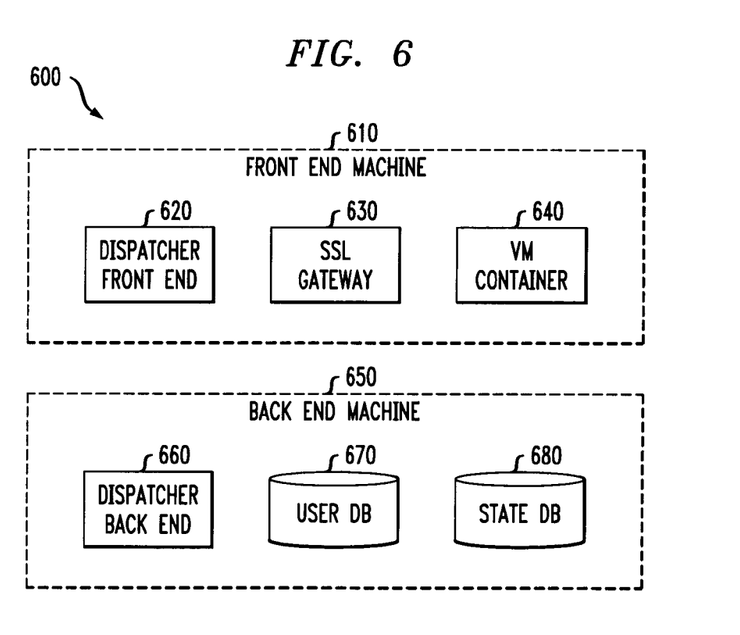
FIG. 6 is a schematic block diagram illustrating an exemplary module of FIG. 5 in further detail.

FIG. 6 is a schematic block diagram illustrating an exemplary module 600 of FIG. 5 in further detail. As shown in FIG. 6, the exemplary module 600 comprises at least one front end machine 610 having a dispatcher front end 620, an SSL gateway 630 and a virtual machine (VM) container 640. In addition, the exemplary module 600 comprises at least one back end machine 650 having a dispatcher back end 660, a user database 670 and a state database 680. The front end machine 610 preferably has a physical separation from the back end machine 650.

Generally, the exemplary SSL gateway 630 transforms SSL communications to Remote Desktop Connection/Virtual Network Computing (RDP/VNC) communications. The dispatcher front end 620 operates in a similar manner to the VM dispatcher 84 of FIG. 4. The virtual machine (VM) containers 640 operate in a similar manner to the VM containers 86 of FIG. 4. The dispatcher back end machine 660 performs the gossip collection from other modules. The user database 670 stores user session data and the state database 680 stores configuration data and the collected gossip data.

Figure 7:
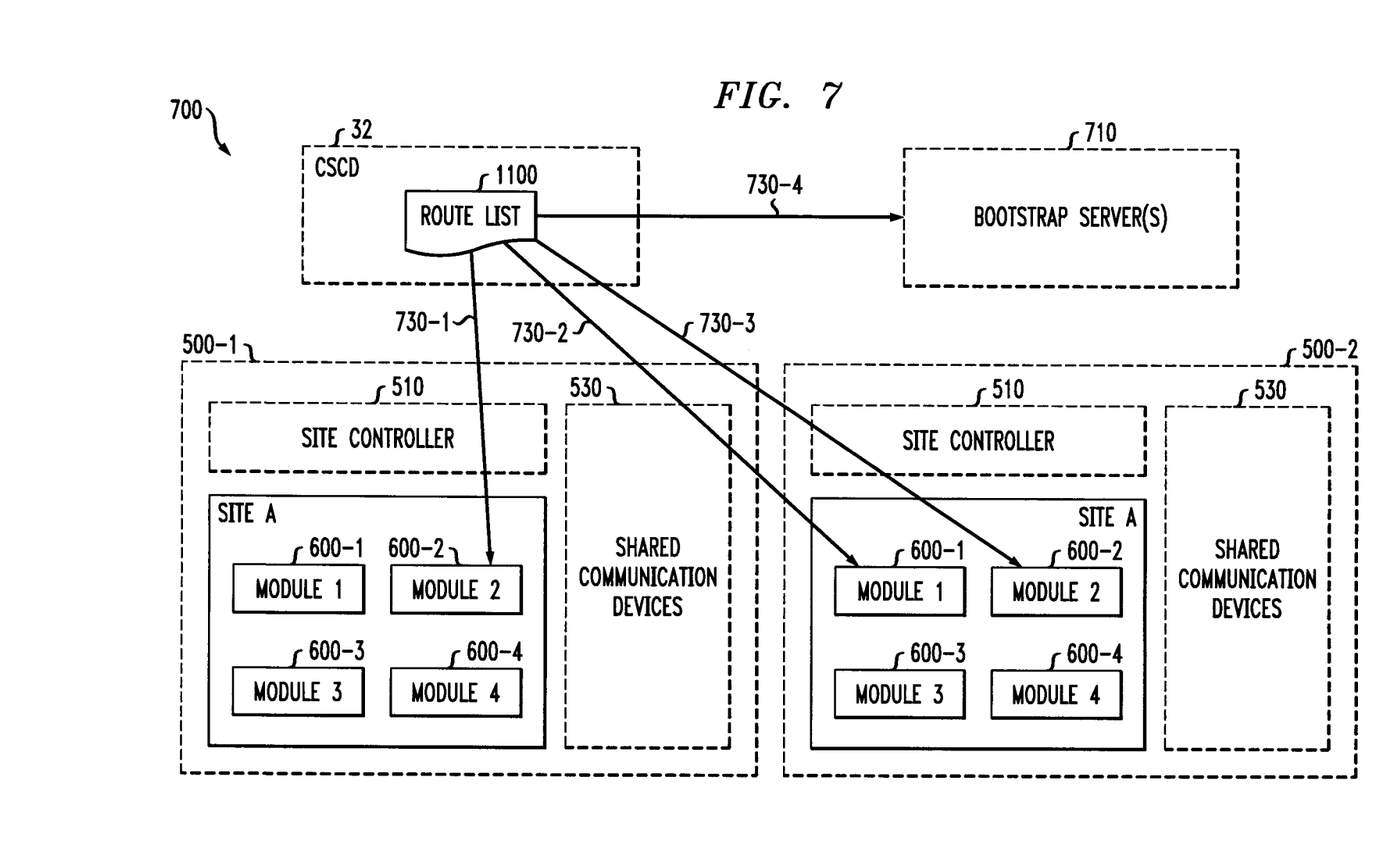
FIG. 7 illustrates the selection of a particular module by a CSCD using a route list, in accordance with an aspect of the present invention.

FIG. 7 illustrates the selection of a particular module 600 by a CSCD 34 using a route list 1100, in accordance with an aspect of the present invention. As shown in FIG. 7, the route list 1100 contains pointers 730-1 through 730-4 to various modules among two virtualization platforms 500-1, 500-2. In one embodiment, once the CSCD 34 selects a module 600 from the route list 1100, the CSCD 34 can communicate directly with the selected module 600, for example, using an RDP protocol over SSL. As shown in FIG. 7, and discussed further below in conjunction with FIG. 8, the route list 1100 includes a pointer 730-4 to one or more bootstrap points 710 that are dedicated devices, generally providing a high availability, that provide a starting point for the creation of the route list 1100.

For a more detailed discussion of suitable techniques for the selection of a module 600, see, for example, G. DeCandia et al., "Dynamo: Amazon's Highly Available Key-Value Store," SOSP 2007 (Oct. 14, 2007), incorporated by reference herein.

Figure 8:
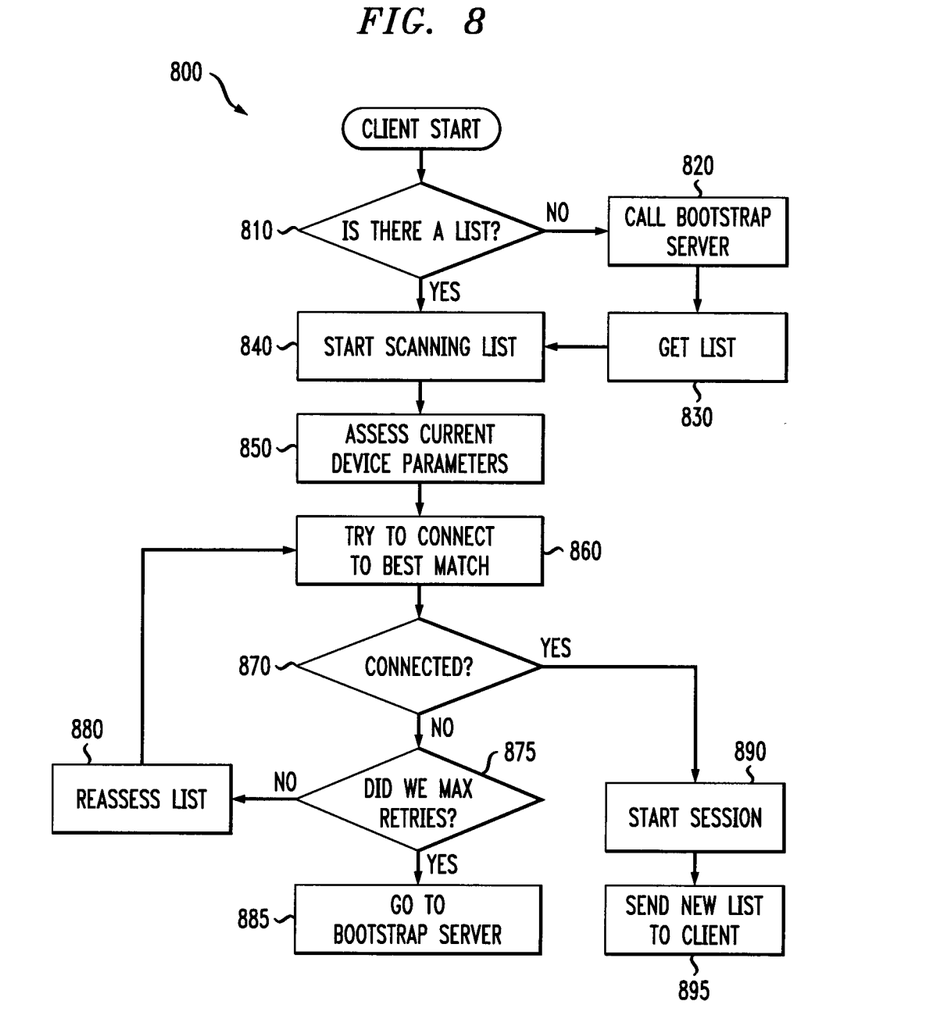
FIG. 8 is a flow chart describing an exemplary implementation of an endpoint session creation process that incorporates features of the present invention.

FIG. 8 is a flow chart describing an exemplary implementation of an endpoint session creation process 800. Generally, as indicated above, the endpoint session creation process 800 evaluates the collected gossip data and selects an appropriate module 600 to serve as a virtualization server 48 for a given virtual session with a desired application server 42.

As shown in FIG. 8, the endpoint session creation process 800 initially performs a test during step 810 to determine if a route list 1100 exists. If it is determined during step 810 that a route list 1100 does not exist, then program control proceeds to step 820, where a call is made to a bootstrap server 710. An initial route list 1100 is obtained from the bootstrap server 710 during step 830 (or the location of one module 600 to start the process) and program control proceeds to step 840.

If, however, it is determined during step 810 that a route list 1100 exists, then the endpoint session creation process 800 scans the list 1100 during step 840. The device parameters (e.g., a performance score) from the list 1100 are assessed during step 850. For example, the location of each module 600 in the list 1100, relative to the CSCD 34 can be assessed. The endpoint session creation process 800 attempts to connect to the "best match" from the list 1100 during step 860.

A test is performed during step 870 to determine if the connection was successful. If it is determined during step 870 that the connection was not successful, then a further test is performed during step 875 to determine if a maximum number of tries have been attempted. If it is determined during step 875 that a maximum number of tries have not been attempted, then the list 1100 is reassessed during step 880 and program control returns to step 860 and continues with another connection attempt. For example, if a module 600 in one geographic area failed, then a module 600 in another geographic area can be attempted on the re-try. If, however, it is determined during step 875 that a maximum number of tries have been attempted, then the bootstrap server 710 is contacted again during step 885 for another starting point.

If, however, it is determined during step 870 that the connection was successful, then the session is started during step 890. For example, an authentication process can be implemented during step 890. A new list is sent to the CSCD 34 during step 895 for the next session. In this manner, the endpoint session creation process 800 selects an appropriate module 600 for each session.

Figure 9:
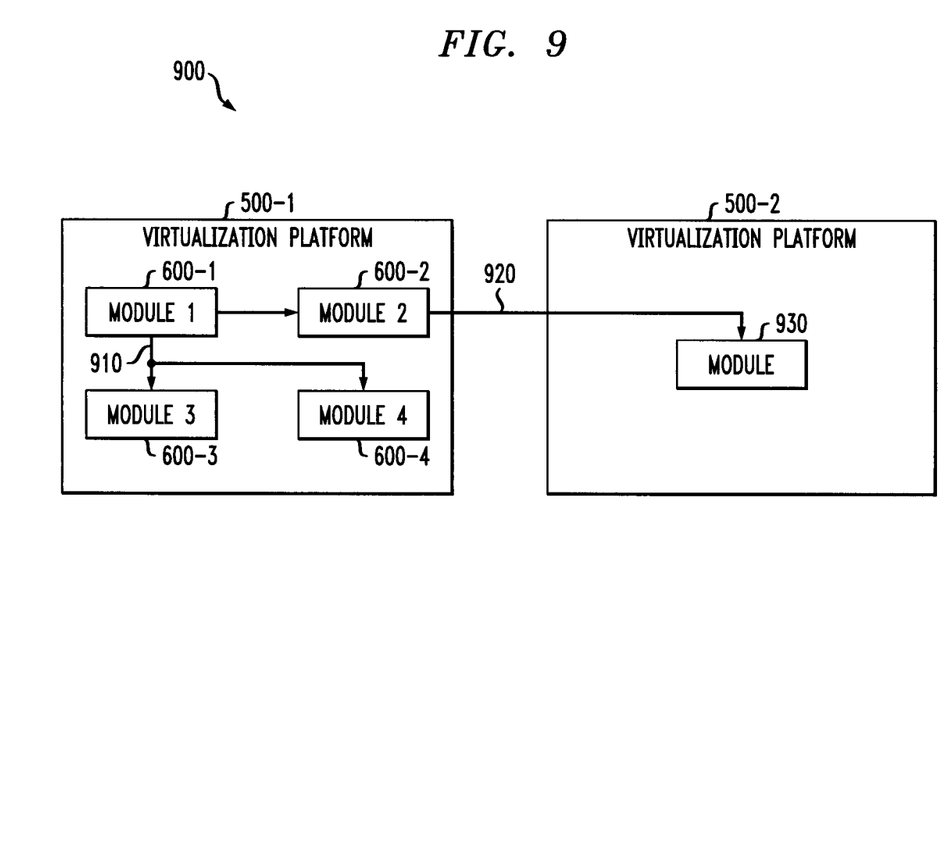
FIG. 9 illustrates the communication of gossip data among a number of modules.

FIG. 9 illustrates the communication of gossip data among modules 600. In particular, FIG. 9 illustrates exemplary peer-to-peer communications 910 from a first module 600-1 within a given virtualization platform 500-1 to one or more additional modules 600-2, 600-3, 600-4. For example, the communication 910 can notify the additional modules 600-2, 600-3, 600-4 that the first module 600-1 is "almost full" or nearing full capacity. One or more of the modules 600-1, 600-2, 600-3, 600-4 can also relay one or more messages 920 to one or more additional modules 930 in other virtualization platforms 500, such as platform 500-2. For a more detailed discussion of an exemplary fault tolerance approach for the collection of gossip data, see, for example, L. Lamport et al., "The Byzantine Generals Problem," ACM Trans. On Programming Languages and Systems, Vol. 4, No. 3, 382-401 (July 1982), incorporated by reference herein.

Figure 10:
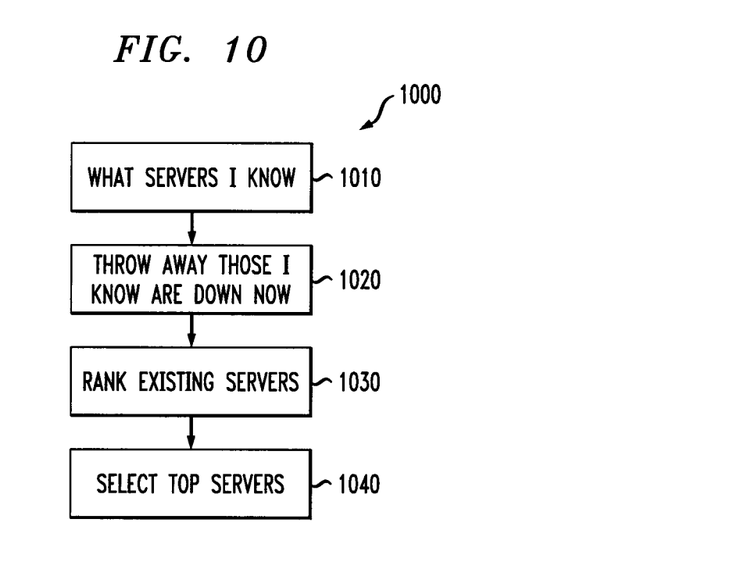
FIG. 10 is a flow chart describing an exemplary process that may be performed by a given module to process collected gossip data.

FIG. 10 is a flow chart describing an exemplary process 1000 that may be performed by a module 600 to process the gossip that is collected. As shown in FIG. 10, a given module 600 may generate a list during step 1010 of the servers known by the module 600. Thereafter, during step 1020, those other modules 600 that are known to be unavailable are deleted from the list. For example, a module 600 may be unavailable if it failed a ping, sent a "module full" message, or sent a "going down" message and no "module reinstatement" message was received.

The remaining servers on the list are ranked during step 1030. For example, the ranking can be based on a response time from other modules 600, a proportional distance from the current module 600, and whether the current module 600 has recently connected to another module 600. During step 1040, the top N modules 600 are selected for consideration. The top N modules 600 can be a number of "local" modules, as well as a number of geographically distributed modules 600. For example, modules 600 can have a state of just started; almost full; going down or not available (provided, e.g., by other modules 600 pinging the module).

Figure 11:
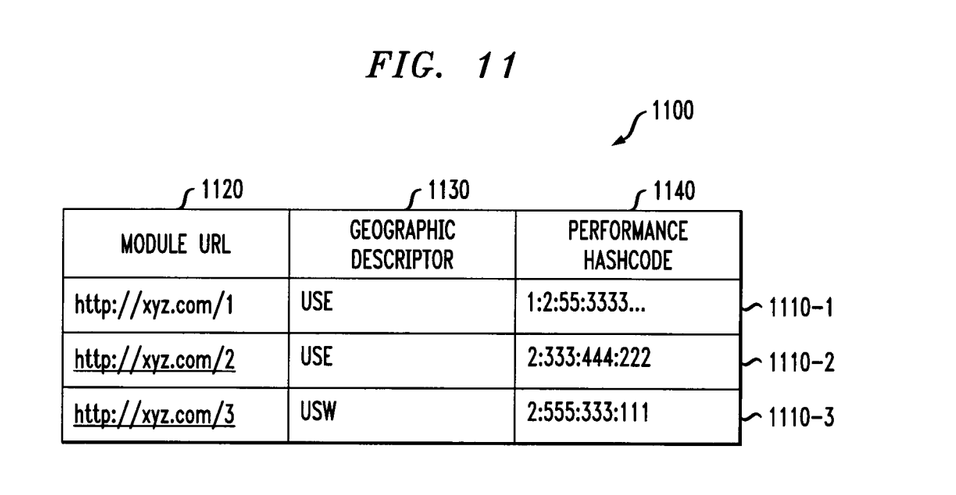
FIG. 11 is a sample table from an exemplary route list incorporating features of the present invention.

FIG. 11 is a sample table from an exemplary route list 1100 incorporating features of the present invention. As shown in FIG. 11, the exemplary route list 1100 comprises a plurality of records 1110-1 through 1110-3, each associated with a different module 600. For each module 600, identified by a server URL in field 1120, the route list 1100 provides a geographic descriptor in field 1130 identifying where the module 600 is located, and a performance hashcode in field 1140. The exemplary server URL identifies a domain associated with the module 600, and the particular machine of the domain. The exemplary performance hashcode is a coded ranking based, for example, on a site rank, a history of all modules, as well as a number of available machines and a minimum response time. The various components of the exemplary performance hashcode can optionally be weighted. In one exemplary implementation, the exemplary performance hashcode comprises a distance metric, a number of available machines, a number of node failures and a mean time between failures. The exemplary route list 1100 employs a hashcode format that is based on Merkel Trees. For a more detailed discussion of Merkel Trees, see, for example, http://en.wikipedia.org/wiki/Hash_tree, incorporated by reference herein. Among other benefits, a Merkel Tree format allows the hashcode to indicate a ranking for each virtualization platform 500 and module 600, as well as the speed and uptime in a tree model.

The disclosed virtualization platforms 500 permit users to work from a secure virtual environment, taking the form of a disposable browser environment, without direct interaction between malware and the remote application server, such as an online banking site.

As mentioned previously herein, the above-described embodiments of the invention are presented by way of illustrative example only. Numerous variations and other alternative embodiments may be used.

For example, it should be understood, that while the application server 42 and the authorization server 44 are typically under the control of an application service provider, such as a bank, the virtualization server 48 and client install server 46 may be under the control of a separate virtualization service provider. Thus, one virtualization provider may contract with multiple banks and other entities to provide virtualization services. Therefore, there may be one virtualization server 48 to service a multitude of different application servers 42, each application server 42 potentially representing a different bank or other secure entity. The application service providers are not limited to banks, but may include, for example, online gaming sites or any other sites requiring a high degree of security. In some cases, several banks will contract with a single entity to provide a single authorization server 44 for a plurality of banks.

It should be understood that the risk-based authentication performed by the authentication server 44, in some embodiments, is capable of utilizing RSA® Adaptive Authentication which is offered by EMC Corporation of Hopkinton, Mass. Certain aspects of RSA® Adaptive Authentication relate to risk-based authentication (RBA) and fraud detection which involve measuring over one hundred risk indicators to identify high-risk and suspicious activities. Certain aspects of RSA® Adaptive Authentication are powered by risk-based authentication technology that conducts a risk assessment of all users behind the scenes. A unique risk score is assigned to each activity, and users are only challenged when an activity is identified as high-risk and/or an organizational policy is violated. This transparent authentication enables organizations to increase security without compromising user convenience. Certain aspects of Adaptive Authentication monitor and authenticate activities based on risk, profiles, and policies by correlating: unique browser identification profiles, matching banking behavioral patterning profiles and inputs from our fraud intelligence teams that locate compromised IP addresses and accounts.

It should be understood that browser 82 may refer to a web browser or to any other type of program used to render and display markup files in a form suitable for viewing by humans. Numerous other known password protection techniques can be used in conjunction with the present invention. Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments will be described below in the context of passwords, it is to be appreciated that the invention is more broadly applicable to any other type of authentication information.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

It should again be emphasized that the particular security techniques described above are provided by way of illustration, and should not be construed as limiting the present invention to any specific embodiment or group of embodiments. For example, the particular configuration of system elements shown in FIGS. 1 through 7, and their interactions as shown in FIGS. 8 through 10, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method, performed in a client-side computing device, for performing secured communications during a virtual session with an application server across a network, the method comprising:
    selecting a remote module, from multiple remote modules, to serve as a virtualization server for the virtual session on the client-side computing device based on performance factors associated with each of the multiple remote modules, wherein said performance factors are (i) related to an availability status of each of the multiple remote modules, and (ii) communicated among the multiple remote modules via peer-to-peer communication, and wherein said selecting comprises:
        ranking the multiple remote modules based on at least a weighted portion of said performance factors, said portion comprising (a) a response time of each of the multiple remote modules, and (b) a proportional distance of each of the multiple remote modules from the client-side computing device; and
        selecting the highest ranked remote module subsequent to said ranking the multiple remote modules;
    establishing the virtual session with the selected module, the selected module being distinct from the application server; and
    performing secured communications between the client-side computing device and the application server via the virtual session of the selected module.

2. The method of claim 1, wherein the virtual session is initialized to a pre-configured state upon establishment.

3. The method of claim 1, wherein the performance factors are collected from a plurality of modules using a gossip-based state notification process.

4. The method of claim 1, wherein the client-side computing device stores the performance factors for a plurality of modules.

5. The method of claim 1, wherein the step of selecting a remote module to serve as a virtualization server evaluates a route list that stores the performance factors for a plurality of modules.

6. The method of claim 5, wherein the route list contains pointers to a plurality of remote modules in a plurality of virtualization platforms.

7. The method of claim 5, wherein the route list is based on a hash tree format that indicates a distance to a given module.

8. The method of claim 5, wherein the route list is generated based on gossip data provided among a plurality of modules to assess the performance of each module.

9. The method of claim 5, wherein the route list can be generated from a bootstrap point.

10. The method of claim 5, wherein the route list comprises a hashcode for each module, wherein said hashcode comprises one or more of a distance metric and a performance metric.

11. The method of claim 1, wherein the remote module can be replaced in the event of a failure.

12. The method of claim 1, wherein the step of perfo ming secured communications between the client-side computing device and the application server further comprises the steps of:
   running a secure browser within the virtual session of the virtualization server; and
   communicating between the client-side computing device and the application server through the secure browser.

13. A tangible machine-readable storage device for storing one or more software programs for use in a client-side computing device to perform secured communications during a virtual session with an application server across a network, controlling user access to an access-controlled resource, wherein the one or more software programs when executed by one or more processing devices implement the steps of the method of claim 1.

14. A client-side computing device, for performing secured communications during a virtual session with an application server across a network, the client-side computing device comprising:
   a memory; and
   at least one processor, coupled to the memory, operative to implement the following steps:
   selecting a remote module, from multiple remote modules, to serve as a virtualization server for the virtual session on the client-side computing device based on performance factors associated with each of the multiple remote modules, wherein said performance factors are (i) related to an availability status of each of the multiple remote modules, and (ii) communicated among the multiple remote modules via peer-to-peer communication, and wherein said selecting comprises:
   ranking the multiple remote modules based on at least a weighted portion of said performance factors, said portion comprising (a) a response time of each of the multiple remote modules, and (b) a proportional distance of each of the multiple remote modules from the client-side computing device; and
   selecting the highest ranked remote module subsequent to said ranking the multiple remote modules;
   establishing the virtual session with the selected module, the selected module being distinct from the application server; and
   performing secured communications between the client-side computing device and the application server via the virtual session of the selected module.

15. The client-side computing device of claim 14, wherein the virtual session is initialized to a pre-configured state upon establishment.

16. The client-side computing device of claim 14, wherein the performance factors are collected from a plurality of modules using a gossip-based state notification process.

17. The client-side computing device of claim 14, further comprising a route list in the memory for storing the performance factors for a plurality of modules.

18. The client-side computing device of claim 17, wherein the route list contains pointers to a plurality of remote modules in a plurality of virtualization platforms.

19. The client-side computing device of claim 17, wherein the route list is based on a hash tree format that indicates a distance to a given module.

20. The client-side computing device of claim 17, wherein the route list is generated based on gossip data provided among a plurality of modules to assess the performance of each module.

21. The client-side computing device of claim 17, wherein the route list can be generated from a bootstrap point.

22. The client-side computing device of claim 17, wherein the route list comprises a hashcode for each module, wherein said hashcode comprises one or more of a distance metric and a performance metric.

23. The client-side computing device of claim 14, wherein the remote module can be replaced in the event of a failure.

24. The client-side computing device of claim 14, wherein said processor is further configured to perform secured communications between the client-side computing device and the application server by executing a secure browser within the virtual session of the virtualization server; and communicating between the client-side computing device and the application server through the secure browser.

\* \* \* \* \*